Feb. 13, 1968     G. D. HANCHETT     3,369,167
SELF-REGULATED POWER SUPPLY
Filed Feb. 28, 1966
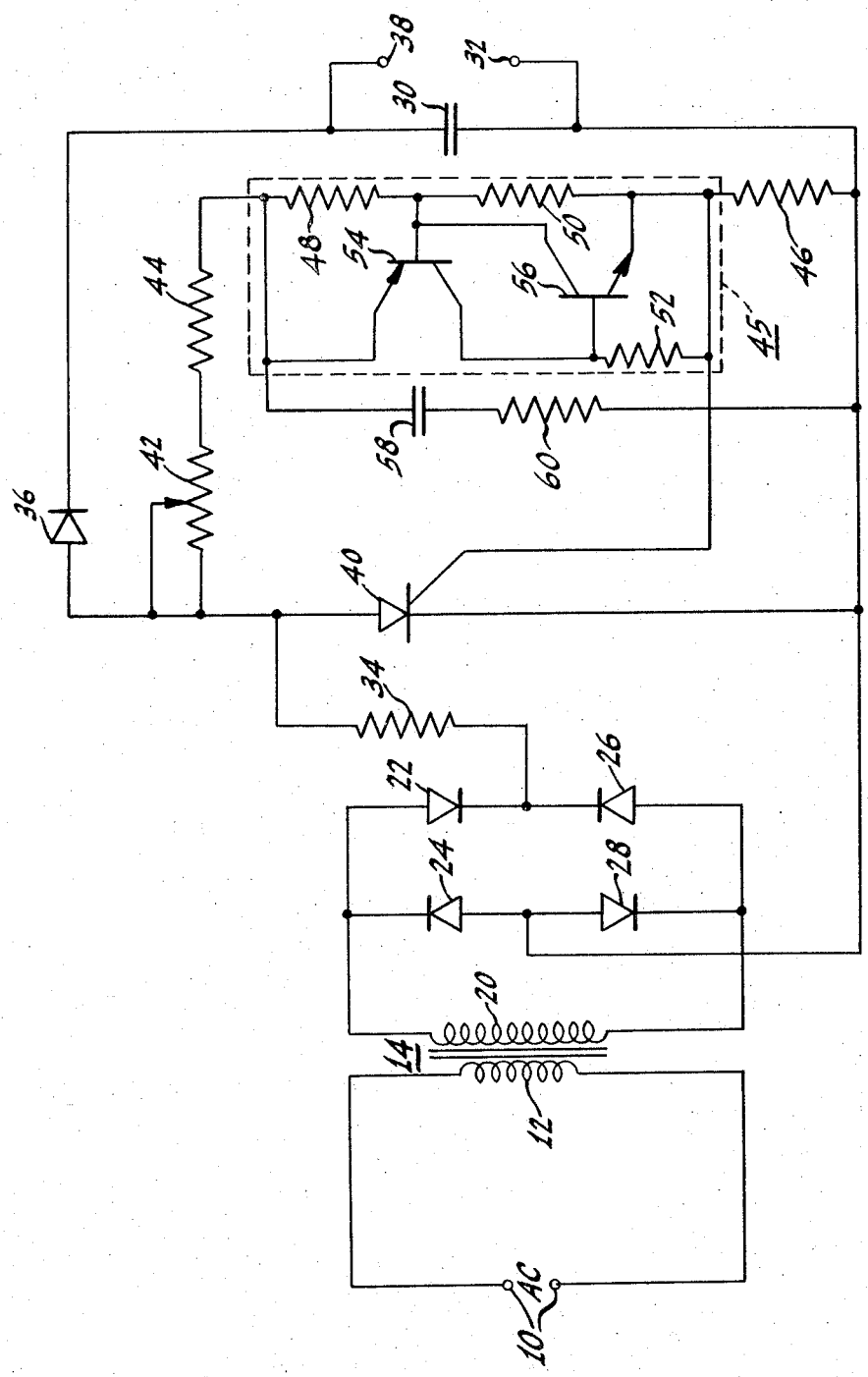
INVENTOR.
GEORGE D. HANCHETT
BY Edward J. Norton
Attorney United States Patent Office 3,369,167
Patented Feb. 13, 1968

3,369,167
SELF-REGULATED POWER SUPPLY
George D. Hanchett, Summit, N.J., assignor to Radio Corporation of America, a corporation of Delaware
Filed Feb. 28, 1966, Ser. No. 530,535
9 Claims. (Cl. 321—18)

This invention relates to an adjustable voltage power supply.

Various applications exist in which the speed or other operation of a driven object is determined by controlling the power applied thereto from a power supply. For example, the speed of model railroad trains and model cars is usually controlled by controlling the voltage applied thereto from an electric power supply. In prior art power supplies for use with model railroad trains and model cars, the voltage regulating portion of the power supply is in series with the electric motors included in the trains and cars. Using such a connection of the voltage regulator, the current requirements of these motors has an unstabilizing effect on the voltage regulator, whereby the speed of the train or the model car will vary, at any setting of the voltage control, in accordance with the load thereon, that is, in accordance with the number of cars in the train and their loading or in accordance with the grade of the tracks or of the road.

It is an object of this invention to provide an improved adjustable voltage power supply.

It is a further object of this invention to provide an adjustable voltage power supply for motors whose speed depends on the voltage of this supply, and includes means for keeping the motor speed more nearly constant as the load varies than heretofore possible.

According to one embodiment of the invention, a voltage regulating power supply is provided including a shunt connected voltage regulating element and in which both the load, for example, a motor, and the control for the voltage regulating element are connected across the voltage regulating element. The electromotive force (E.M.F.) provided by the load, if it is a motor, so influences the control for the voltage regulating element that the motor speed tends to be kept constant regardless of the operating condition of the load or motor.

The invention is described in connection with the accompanying drawing, the sole figure of which illustrates a schematic circuit diagram of an embodiment of the inventive device.

Turning to the figure, alternating current from a source thereof, not shown, is connected between the input terminals 10. The terminals 10 are connected to the end terminals of the primary winding 12 of a transformer 14 which may have an iron core. One terminal of the secondary winding 20 of the transformer 14 is connected to the anode of a diode 22 and to the cathode of a second diode 24. The other terminal of the secondary winding 20 is connected to the anode of a third diode 26 and to the cathode of a fourth diode 28. The remaining electrodes of the diodes 24 and 28 are connected together and to one terminal of a smoothing capacitor 30 and also to one output terminal 32 of the described voltage regulator circuit. The remaining electrodes of the diodes 22 and 26 are connected together and through a current limiting resistor 34 to the anode of a diode 36. The cathode of the diode 36 is connected to the other terminal of the smoothing capacitor 30 and to the other output terminal 38. The anode of a silicon controlled rectifier (SCR) 40 is connected to the anode of the diode 36. The cathode of the SCR 40 is connected to the terminal 32. The SCR 40 comprises the shunt connected voltage regulating element of the described regulator. A voltage controlling variable resistor 42, a resistor 44, a voltage responsive regenerative switch 45 and a resistor 46 are connected in series between the anode and the cathode of the SCR 40.

The voltage responsive regenerative switch 45 comprises three resistors 48, 50 and 52 and two transistors 54 and 56. The resistors 48, 50 and 52 are connected in series in the order named between the emitter of the PNP transistor 54 and the base of the NPN transistor 56. The base of the transistor 54 is connected to the junction of the resistors 48 and 50. The emitter of the transistor 56 is connected to the junction of the resistors 50 and 52. The collector of the transistor 56 is connected to the base of the transistor 54. The base of the transistor 56 is connected to the collector of the transistor 54. The terminals of the regenerative switch 45, comprising the emitters of the transistors 54 and 56, are connected respectively to the resistors 44 and 46.

A capacitor 58 and a current limiting resistor 60 are connected in series between the emitter of the transistor 54 and the cathode of the SCR 40. The resistor 46, which is connected between the control electrode and the cathode of the SCR 40 acts to prevent undesired extraneous leakage currents from turning on the SCR 40.

As is known, the SCR 40 acts somewhat as a thyratron in that, in the absence of a positive voltage of the proper amplitude on its control electrode with respect to its cathode, the SCR is nonconductive. When rendered conductive by such a voltage on its control electrode, the SCR acts as a rectifier and conducts conventional current in a direction from its anode to its cathode. Once the SCR becomes conductive, it remains conductive after the voltage on its control electrode disappears until the voltage between its anode and cathode is too low to sustain conduction of the SCR.

In the circuit as described, the alternating voltage appearing across the secondary winding 20 appears as a direct current across the anode and cathode of the SCR 40. This direct current fluctuates in value from its maximum value to a value so low that the conductivity of the SCR 40 connected thereacross is not sustained. The frequency of the fluctuating current is twice the frequency of the source connected between the terminals 10. Therefore, when rendered conductive during a cycle of the fluctuating current applied thereto, the SCR conducts current, in series with the resistor 34 for the remainder of that cycle. Although the voltage across the SCR 40 fluctuates between wide limits, due to the operation of the rectifier 36 and the smoothing capacitor 30, the voltage across the terminals 32 and 38 is nearly constant. The voltage appearing across the SCR 40 also appears across the resistors 42, 44, the switch 45 and the resistor 46 in series, and also across the resistors 42, 44, 60 and the capacitor 58 in series. While current flows through the resistor 46 as long as A.C. is applied to the terminals 10, the voltage built up across the resistor 46 and applied between the cathode and control electrodes of the SCR 40 is insufficient to cause conductivity of the SCR 40 while the transistors 54 and 56 are nonconductive. The capacitor 58 tends to charge up during each cycle of the fluctuating voltage to the voltage across the switch 45 and the resistor 46, at a rate inversely proportional to the adjusted value of the resistor 42.

At the beginning of the cycle of the fluctuating voltage, the potential of the emitter of the transistor 54 with respect to its base is limited by the voltage on the uncharged capacitor 58 to a value that keeps the transistor 54, comprising part of the switch 45, nonconductive. The capacitor 58 is charged during each cycle of the fluctuating voltage appearing across the SCR 40 and arrives, at an earlier or at a later time in the cycle, depending on the adjusted size of the resistor 42, at a voltage sufficient to cause the transistor 54 to become conductive and thereby effectively to shunt the resistor 48. When the transistor 54 is conductive, the voltage on the base of the transistor 56 with respect to its emitter becomes such as to make it conductive to shunt the resistor 50. The switch 45 is now conductive to provide a low resistance path between the resistors 44 and 46. The capacitor 58 then discharges through the transistors 54 and 56 (comprising the switch 45), the gate to cathode path of the SCR 40 and the resistor 60 in series. The resistor 60 limits this discharge current to a safe value. The SCR 40 becomes conductive and shunts the current provided by the full wave rectifier 22 to 28 away from the load (not shown) connected between the terminals 38 and 32. This occurs sooner or later in each cycle of the fluctuating wave applied to the SCR depending on the adjustment of the resistor 42 and continues to the end of that cycle. The SCR 40 and the switch 45 each become nonconductive between cycles of the fluctuating current due to the reduction of the voltage applied thereacross to too low a value to sustain conduction of the SCR 40 or the switch 45. Therefore, the current applied to the load depends on the portion of each cycle that the SCR 40 is conductive which itself depends on the adjustment of the value of the resistor 42.

It will be noted that the diode 36 and the load connected between the terminals 38 and 32 are in parallel with the variable resistor 42 and the resistors 44 and 46 and the switch 45 in series. Therefore, any voltage appearing across the load influences the speed of charge of the capacitor 58 and therefore also the portion of each cycle that the SCR 40 is conductive. That is, if the load is a motor, whose back E.M.F. depends on its speed, then the voltage applied across the control electrode and cathode of the SCR 40 when it is non-conductive would be greater when the speed of the motor is high than when the speed of the motor is low. Then, the capacitor 58 reaches the charge at which the switch 45 becomes conductive a little sooner in each cycle when the back E.M.F. is high than when it is low and more current is shunted away from the load by the SCR 40. The final result is that the speed of the motor supplied by the described voltage supply tends to be independent of the load on the motor.

Since many modifications can be made in the invention as described within the spirit of the invention, the above description is to be considered as illustrative and not in a limiting manner.

What is claimed is:
1. In combination,
   a controlled switching means having an anode, a cathode and a control electrode, said controlled switching means exhibiting a threshold value below which voltage applied between its anode and its cathode will not sustain current flow therebetween,
   means for connecting said anode and said cathode across a pair of input terminals across which a direct current source may be connected, the current supplied by said source fluctuating periodically between values above and below said threshold value,
   an adjustable time constant circuit including a storage element connected between the anode and the cathode of said controlled switching means,
   a voltage responsive switching means connected between the control electrode of said controlled switching means and a terminal of said storage element, said voltage responsive switching means becoming conductive when the voltage builds up to a predetermined value across said storage element whereupon said storage element discharges through said voltage responsive switching means and the control electrode to cathode path of said controlled switching means to cause said controlled switching means to become conductive sooner or later in each cycle of the applied fluctuating current depending on the adjustment of said time constant circuit, and
   means to connect a load across the cathode to anode path of said controlled switching means whereby increase and decrease of the voltage built up across said load speeds up and slows down the charging of said storage element respectively to correspondingly speed up and slow down the time point in each cycle that the controlled switching means becomes conductive.

2. The invention as described in claim 1 in which said controlled switching means comprises a silicon controlled rectifier.

3. The invention as described in claim 1 in which said controlled switching means comprises a silicon controlled rectifier and in which said load connecting means includes a rectifier poled to permit current flow therethrough to the load and a smoothing capacitor.

4. The invention as described in claim 1 in which said controlled switching means comprises a silicon controlled rectifier, and in which said load connecting means includes a rectifier poled to permit current flow through the load and a smoothing capacitor and also in which said voltage responsive switching means comprises a pair of resistors in series and a pair of transistors each transistor shunting a respective resistor when conductive, said transistors being rendered conductive when the voltage across said capacitor builds up to said predetermined value.

5. The invention as described in claim 1 in which said source includes a full wave rectifier connected across said input terminals and in which a current limiting resistor is provided in circuit between said full wave rectifier and an electrode of said controlled switching means.

6. A regulated power supply comprising,
   a controlled switching means including an anode, a cathode and a control electrode, said controlled switching means being rendered conductive by the application of a sufficient voltage between its control electrode and cathode and remaining conductive as long as the voltage applied between its anode and cathode exceeds a predetermined threshold value,
   a rectifier providing at its output terminals a direct current output that varies between a value above and below said threshold value periodically,
   means including a current limiting resistor for connecting said output terminals between the anode and cathode of said controlled switching means,
   a variable time constant circuit comprising a resistor and a storage capacitor connected between said anode and said cathode,
   a voltage responsive switching means connected between a terminal of said storage capacitor and the control electrode of said controlled switching means,
   a pair of output terminals,
   a smoothing capacitor connected across said output terminals, and
   a rectifier poled to be conductive to said direct current connected in series with said smoothing capacitor across said anode and said cathode,
   said storage capacitor charging and arriving at a potential in each cycle of said varying direct current at a time depending on the adjustment of said time constant circuit and also depending on the voltage appearing across said load at which potential said voltage responsive switching means becomes conductive whereby said storage capacitor discharges through said voltage responsive switching means and thru the control electrode to cathode path of said controlled switching means to cause it to become conductive earlier or later in each cycle of said varying direct current depending on the adjustment of said variable time constant circuit.

7. The invention as expressed in claim 6 in which said controlled switching means is a silicon controlled rectifier.

8. The invention as described in claim 6 in which said controlled switching means is a silicon controlled rectifier and in which said voltage controlled switching means comprises two additional resistors and two transistors, said transistors being connected across respective ones of said resistors, said switching mean also including means responsive to voltage of a predetermined value to cause said transistors to shunt their respective resistors.

9. The invention as expressed in claim 6 in which said voltage controlled switching means comprises two additional resistors and two transistors each of which is connected to shunt respective ones of said resistors, said voltage controlled switching means also including means responsive to a voltage a predetermined value to cause said transistors to shunt their respective resistors.

References Cited
UNITED STATES PATENTS

| | | | |
|---|---|---|---|
| 2,904,742 | 9/1959 | Chase | 323—22 |
| 3,130,361 | 4/1964 | Ioakimidis | 323—22 |
| 3,174,096 | 3/1965 | Lichowsky | 323—22 |
| 3,195,029 | 7/1965 | Gilbreath | 323—22 X |
| 3,221,241 | 11/1965 | Greenberg et al. | 321—18 X |
| 3,275,802 | 9/1966 | Vandivere et al. | |
| 3,293,524 | 12/1966 | Parrish | 318—331 |
| 3,321,641 | 5/1967 | Howell | 307—88.5 |
| 3,334,244 | 8/1967 | Hanchett | 307—88.5 |

JOHN F. COUCH, *Primary Examiner.*

W. SHOOP, *Assistant Examiner.*